Feb. 27, 1940.     R. M. COOLEY     2,191,558
HIGHWAY VISION DEVICE
Filed Sept. 8, 1936
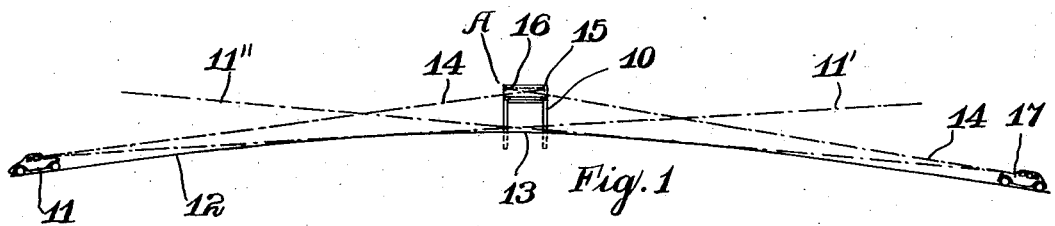
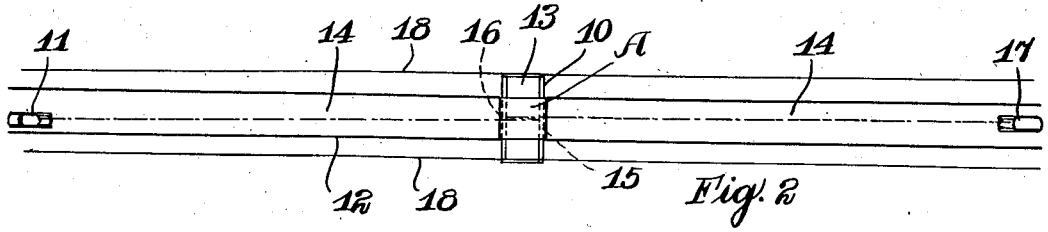
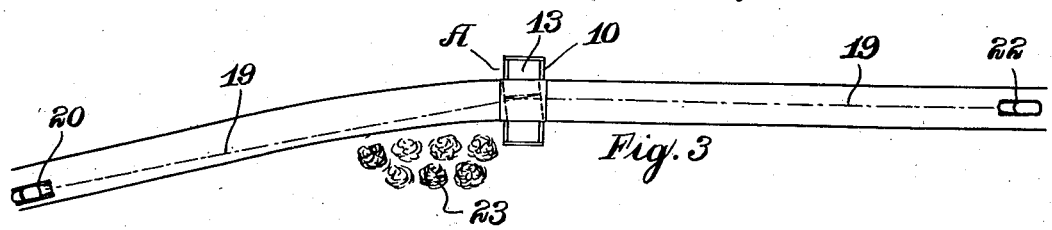
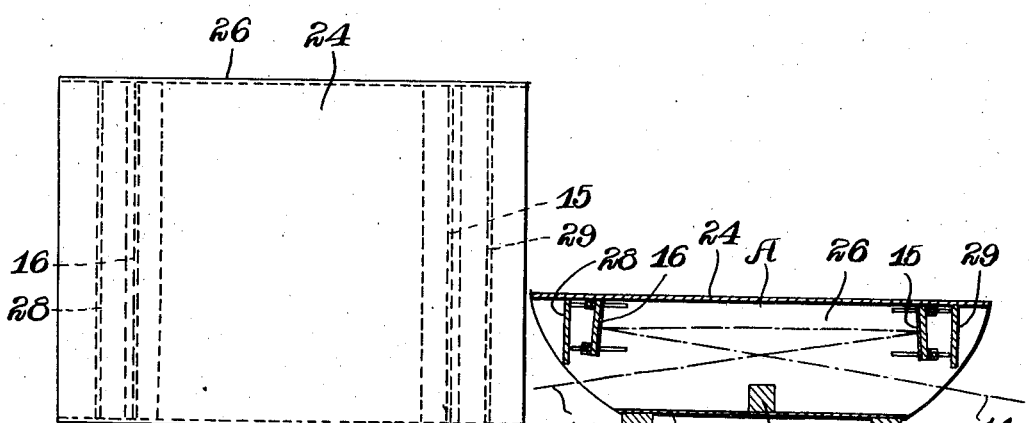
Inventor
Ralph M. Cooley
By Howard L. Fischer
Attorney Patented Feb. 27, 1940

2,191,558

UNITED STATES PATENT OFFICE 2,191,558

HIGHWAY VISION DEVICE

Ralph M. Cooley, St. Paul, Minn.

Application September 8, 1936, Serial No. 99,686

3 Claims. (Cl. 88—78)

My invention relates to an improvement in a highway vision device, of a type designed to provide a clear view of the highway to be travelled by a car, regardless of the curve or change in elevation of the highway.

I have found that a great number of accidents which occur on highways are due to one car passing another on a blind hill or while travelling around a curve. Many other accidents are caused by cars approaching a railway crossing at a high rate of speed, so that it is impossible to stop in time to avoid hitting a train crossing the highway. Various warning signals have been provided; but these are costly to maintain, and apt to fail mechanically when needed. Legislation has been passed making it illegal to pass other cars on blind hills or on curves, and requiring cars to stop before crossing a railway right of way; but it is extremely difficult to enforce these laws, and such accidents continue unabated.

It is the purpose of the present invention to provide a simple means which will permit a motorist to have a clear view of the highway for some considerable distance over a blind hill, around a blind corner, or to view approaching trains in spite of blind crossings. This device works on the periscopic principle, with mirrors so arranged to provide a clear view.

It is my object to provide a means, which is preferably enclosed to admit a minimum of light, in which mirrors are arranged in such a manner that a line of sight is provided for a motorist climbing one side of a hill of a path on the other side of the hill. I have found that it is usually possible to obtain a view of several hundred feet along a highway which would otherwise be entirely hidden from view by the crest of the hill.

It is also my object to provide a means comprising a series of enclosed mirrors which will provide a line of sight of several hundred feet of highway about a blind curve or turn which would otherwise be entirely concealed from view. The device is of such size to provide a view of at least one side of the highway, so that a motorist approaching the crest of a blind hill or turn will be able to see at a glance the condition of the highway on the other side of the hill.

These and other objects and novel features of my invention will be more clearly and fully set forth in the following specification and claims.

In the drawing forming a part of my specification:

Figure 1 is a diagrammatic side elevation view of a highway leading over a blind hill, illustrating the line of vision provided by my device.

Figure 2 is a plan view of the highway illustrated in Figure 1, showing the line of vision provided by my device.

Figure 3 is a plan view of a highway, which may be that shown in Figure 1, in which the highway not only passes over a blind hill, but also extends around a curve.

Figure 4 is a plan view of a form of my device indicated in Figure 1, showing the position of the mirrors therein in dotted lines.

Figure 5 is a cross-sectional view through the device as shown in Figure 4, disclosing the position of the mirrors.

While rather specific construction is shown, it is to be understood that this construction doubtless must be modified to conform with various state regulations and laws, and to agree with specifications proposed by various railroads. For this reason, the construction is shown as an illustration of the manner in which the mirrors may be arranged. For this reason also the specific detail of the supporting standard is not provided; for this construction is widely different in various states, some requiring all steel frame construction and other states preferring wooden standards.

The vision device A is shown in Figures 1 and 2 constructed to straddle a highway, having supporting standard means 10 which elevate the device above the necessary height for providing clearance for all vehicles which might pass under the same. With respect to the car 11 shown at the left of the highway line 12, the line 11' represents the normal line of vision of the driver. It will be noted that the driver cannot see a vehicle approaching the crest 13 of the highway 12 until such a vehicle is almost at the crest of the hill. The line 14, however, shows the line of vision of the driver into the vision device A, which is reflected by the mirror 15 to the mirror 16. The line 14 continues from the mirror 16 to the car 17, approaching the crest 13 of the highway 12 from the opposite direction. The car 17 is shown at the extreme right of Figures 1 and 2. The line 11" indicates the normal line of vision of the driver of car 17.

It is accordingly obvious that the driver of either car 11 or 17 may see, along the line of vision 14, the other car approaching the crest of the hill. This line of vision 14 changes of course, with the position of the cars 11 and 17; but the size of the mirrors 15 and 16 is such as to maintain the line of vision for several feet on either side of the crest 13 of the hill.

It will be noted that the mirrors 15 and 16 are of considerable width, as seen in Figure 2; and the standard 10 extends to either side of the highway beyond the shoulder of the highway, indicated by the lines 18.

It is of course possible to place the vision device A to one side of the highway entirely, particularly when it is desired to provide vision around blind turns in the highway. This is done where possible to place the device entirely off of the highway.

In Figure 3 it may be seen that by placing the mirrors 15 and 16 at the proper angles, the line of vision 19 may be reflected by these mirrors from one car 20 at the extreme left of the view approaching the curve and the crest of the hill to the other car 22 at the extreme right of the view approaching the crest 13 from the opposite direction. Thus a view of one of these cars may be obtained by the driver of the oppositely travelling car, regardless of the blind hill, and irrespective of any trees, such as are indicated at 23, which would otherwise conceal the cars from each other.

The device A may be formed as illustrated in Figures 4 and 5 of the drawing. In this modification, the device A is formed in a box-like enclosure having a top 24, a bottom 25, and side walls 26 and 27. The line of vision 14 enters the left end of the enclosure near the bottom 25 thereof, and is reflected by a mirror 15 near the right hand end of the enclosure, as seen in Figure 5. The line 14 continues to the mirror 16, mounted near the left hand end of the enclosure, and passes out of the enclosure near the bottom 25 thereof at the right hand end thereof. Ends 28 and 29 are formed on the enclosure, extending from the top 24 to a point spaced sufficiently from the bottom 25 to provide a clear view of the mirrors. These ends 28 and 29 conceal the rear surfaces of the mirrors 15 and 16, and act as a protection for these mirrors from rain, sleet and snow. These ends 28 and 29 also keep a large amount of light from entering the enclosure; as it is preferable to keep the inside of the enclosure as dark as possible for the best possible vision through the device. A baffle 30 mounted centrally in the enclosure prevents light from passing entirely through the enclosure; and the line of vision 14 extends above this central baffle.

In accordance with the patent statutes, I have described the principles of operation and construction of my devices. In making this description, I have disclosed various forms of my device which represents the types of construction which may be used. I desire to have it understood that these forms are shown and described in detail only as a means of pointing out my invention, and that shapes and sizes of these units must be changed to suit the various individual problems which must be met. I therefore desire to point out that obvious changes may be made within the scope of the following claims without departing from the spirit of my invention.

I claim:

1. A vision device comprising a tubular housing having open ends, means for mounting said housing adjacent a highway with its longitudinal axis substantially parallel to the center line of the highway, the top of said housing being longer than the bottom thereof, a mirror mounted transversely across each end of said housing with its reflecting surface facing the interior of the housing, each of said mirrors being of such dimensions and so positioned as to permit light rays entering the adjacent end of the housing to pass between an edge of the mirror and the adjacent wall of the housing, the relative positions of the mirrors being such that light rays entering one end of the housing are received by the mirror at the other end of the housing, reflected to the mirror at the first mentioned end of the housing, and reflected by the last mentioned mirror through the said other end of the housing.

2. A vision device comprising a tubular housing having open ends, means for mounting said housing adjacent a highway with its longitudinal axis substantially parallel to the center line of the highway, a mirror mounted transversely across each end of said housing with its reflecting surface facing the interior of the housing, each of said mirrors being of such dimensions and so positioned as to permit light rays entering the adjacent end of the housing to pass between an edge of the mirror and the adjacent wall of the housing, the relative positions of the mirrors being such that light rays entering one end of the housing are received by the mirror at the other end of the housing, reflected to the mirror at the first mentioned end of the housing, and reflected by the last mentioned mirror through the said other end of the housing.

3. A vision device comprising a tubular housing having open ends, means for mounting said housing adjacent a highway with its longitudinal axis substantially parallel to the center line of the highway, a mirror mounted transversely across each end of said housing with its reflecting surface facing the interior of the housing, each of said mirrors being of such dimensions and so positioned as to permit light rays entering the adjacent end of the housing to pass between an edge of the mirror and the adjacent wall of the housing, the relative positions of the mirrors being such that light rays entering one end of the housing are received by the mirror at the other end of the housing, reflected to the mirror at the first mentioned end of the housing, and reflected by the last mentioned mirror through the said other end of the housing, and baffle means mounted transversely across each end of said housing adjacent the rear surface of each of said mirrors, said baffle means being of such dimensions and so positioned as to permit light rays entering the adjacent end of the housing to pass between an edge of said baffle means and the adjacent wall of the housing.

RALPH M. COOLEY.